United States Patent [19]

Muller

[11] 4,095,271
[45] June 13, 1978

[54] AIRCRAFT PITCH ATTITUDE SIGNAL GENERATOR

[75] Inventor: Hans Rudolf Muller, Kirkland, Wash.

[73] Assignee: Sundstrand Data Control, Inc., Redmond, Wash.

[21] Appl. No.: 789,153

[22] Filed: Apr. 20, 1977

[51] Int. Cl.² ............................................. G06G 7/78
[52] U.S. Cl. ................................ 364/434; 73/178 R; 244/181; 244/191; 340/27 NA; 364/453
[58] Field of Search ........... 235/150.2, 150.26, 150.27; 244/181, 191; 340/27 NA; 73/178 R; 364/434, 453

[56] References Cited

U.S. PATENT DOCUMENTS

| | | | |
|---|---|---|---|
| 3,215,374 | 11/1965 | Olshausen | 244/191 |
| 3,686,626 | 8/1972 | Bateman et al. | 244/181 X |
| 3,691,356 | 9/1972 | Miller | 244/181 X |
| 3,851,303 | 11/1974 | Muller | 340/27 NA |
| 3,948,096 | 4/1976 | Miller | 73/178 R |
| 4,012,713 | 3/1977 | Greene et al. | 340/27 R |

*Primary Examiner*—Joseph F. Ruggiero

*Attorney, Agent, or Firm*—Ted E. Killingsworth; Michael B. McMurry; William R. Peoples

[57] ABSTRACT

In order to provide a more accurate representation of aircraft pitch attitude for use in aircraft head up display devices, a circuit for generating a computed pitch signal responds to a longitudinal accelerometer and a vertical gyroscope within the aircraft wherein the computed pitch signal is generated by adding to the gyro pitch signal a correction factor computed by subtracting the value of the computed pitch signal from an inertial pitch signal derived from the longitudinal accelerometer. In order to compensate for the effects of aircraft acceleration on the longitudinal accelerometer signal, a computed acceleration signal derived from the difference between the longitudinal accelerometer signal and the gyro pitch signal is subtracted from the longitudinal accelerometer to generate the inertial pitch signal. To further compensate the systems for long term errors in the gyro pitch signal, the combined longitudinal acceleration and gyro pitch signal is subtracted from a differentiated air speed signal and the resulting difference signal is integrated over time to generate an acceleration correction signal that is applied to the computed acceleration signal.

35 Claims, 1 Drawing Figure

AIRCRAFT PITCH ATTITUDE SIGNAL GENERATOR

BACKGROUND OF THE INVENTION

This invention relates to means for generating the pitch signal for use with aircraft head up displays and more particularly to compensating the computed pitch signal for long term errors in a gyroscope and unexpected shifts in the air mass.

Prior art pitch computation circuits are disclosed in Astengo, U.S. Pat. No. 3,744,309, and Muller, U.S. Pat. No. 3,851,303, both of which are assigned to the assignee of this application. It is important to have the computed pitch signal as accurate as possible since an accurate pitch signal is required for use with the aircraft head up display devices such as those disclosed in Bateman U.S. Pat. No. 3,654,806; Bateman U.S. Pat. No. 3,686,626 and Kirschner U.S. Pat. No. 3,816,005 all of which are assigned to assignee of this application. As may be appreciated from the examination of the foregoing patents, an accurate pitch signal is highly desirable for the proper operation of these head up display instruments especially when they are used during aircraft landing operations.

In the computed pitch circuit as disclosed in the Muller U.S. Pat. No. 3,851,303 a longitudinal accelerometer signal is compensated by means of a signal representing the differentiated air speed of the aircraft so that the longitudinal accelerometer provides a reasonable accurate indication of the aircraft's pitch attitude. However, when the air mass itself is changing velocity, the air speed input to the system can introduce an error into the pitch computations.

SUMMARY OF THE INVENTION

It is therefore an object of the invention to provide a circuit for computing the pitch attitude of an aircraft utilizing a longitudinal accelerometer, a gyroscopic pitch indication and an air speed input wherein errors in the computed pitch signal due to changes in the velocity of the air mass are minimized.

It is an additional object of the invention to provide an aircraft computed pitch signal wherein signals representing longitudinal acceleration of the aircraft and gyroscope pitch signals are combined to generate a computed acceleration signal; the computed acceleration signal and the longitudinal acceleration signal are combined to produce an inertial pitch signal that is used in combination with the gyro pitch signal to generate the computed aircraft pitch attitude signal.

It is a further object of the invention to provide a circuit for generating a computed aircraft pitch attitude signal wherein a longitudinal accelerometer and a pitch gyroscope are utilized to generate a computed acceleration signal which in turn is modified by a differentiated air speed signal to eliminate long term gyro errors wherein the computed acceleration signal is combined with the computed pitch signal and the gyro pitch signal to produce an accurate computed pitch signal.

It is another object of the invention to provide a circuit for generating an aircraft computed pitch attitude signal wherein a gyroscopic pitch signal is subtracted from a longitudinal accelerometer signal to get a computed aircraft horizontal acceleration signal which in turn is subtracted from a differentiated air speed signal to get an acceleration difference signal which is integrated over time to generate an acceleration correction signal that in turn is added to the computed acceleration signal which in turn is subtracted from the longitudinal accelerometer signal to get a measure of inertial pitch that in turn is compared to the computed pitch signal which gives a measure of pitch error which is added to the gyro pitch signal to produce the computed pitch signal.

To summarize the operation of the pitch generator circuit, a longitudinal accelerometer, a vertical gyroscope and a signal representing the change in velocity of the aircraft's air speed are combined to produce a computed acceleration signal or what may be termed as a pseudo inertial acceleration signal that represents the horizontal acceleration of the aircraft. The gyro pitch signal is subtracted from the longitudinal accelerometer signal so as to get a measure of the aircrafts's horizontal acceleration. A differentiated value of the air speed signal is then compared to this computed horizontal acceleration signal to get a measure of the difference in computed acceleration and aircraft acceleration as measured from changes in the velocity of the air mass through which the aircraft is traveling. The difference signal is then integrated over time and is applied to the longitudinal acceleration signal as a correction factor, that serves to eliminate the effects of gyro error, to produce the computed acceleration or pseudo inertial acceleration signal which represents the aircraft's actual acceleration.

The computed acceleration signal is then subtracted from the longitudinal accelerometer signal to eliminate from the longitudinal accelerometer signal that portion of the signal which is the result of horizontal acceleration of the aircraft. The resulting signal represents the pitch as measured by the accelerometer. Subtracted from this pitch signal is the computed pitch signal to produce a pitch error signal. The pitch error signal is then integrated over time and combined with the gyro pitch signal to produce the computed pitch signal. As set forth in the Muller U.S. Pat. No. 3,851,303, the object of the pitch correction signal is to eliminate from the computed pitch signal the long term errors in the gyro pitch signal while permitting short term changes in the gyro pitch signal to change the computed pitch signal.

DETAILED DESCRIPTION OF THE INVENTION

Figure 1:
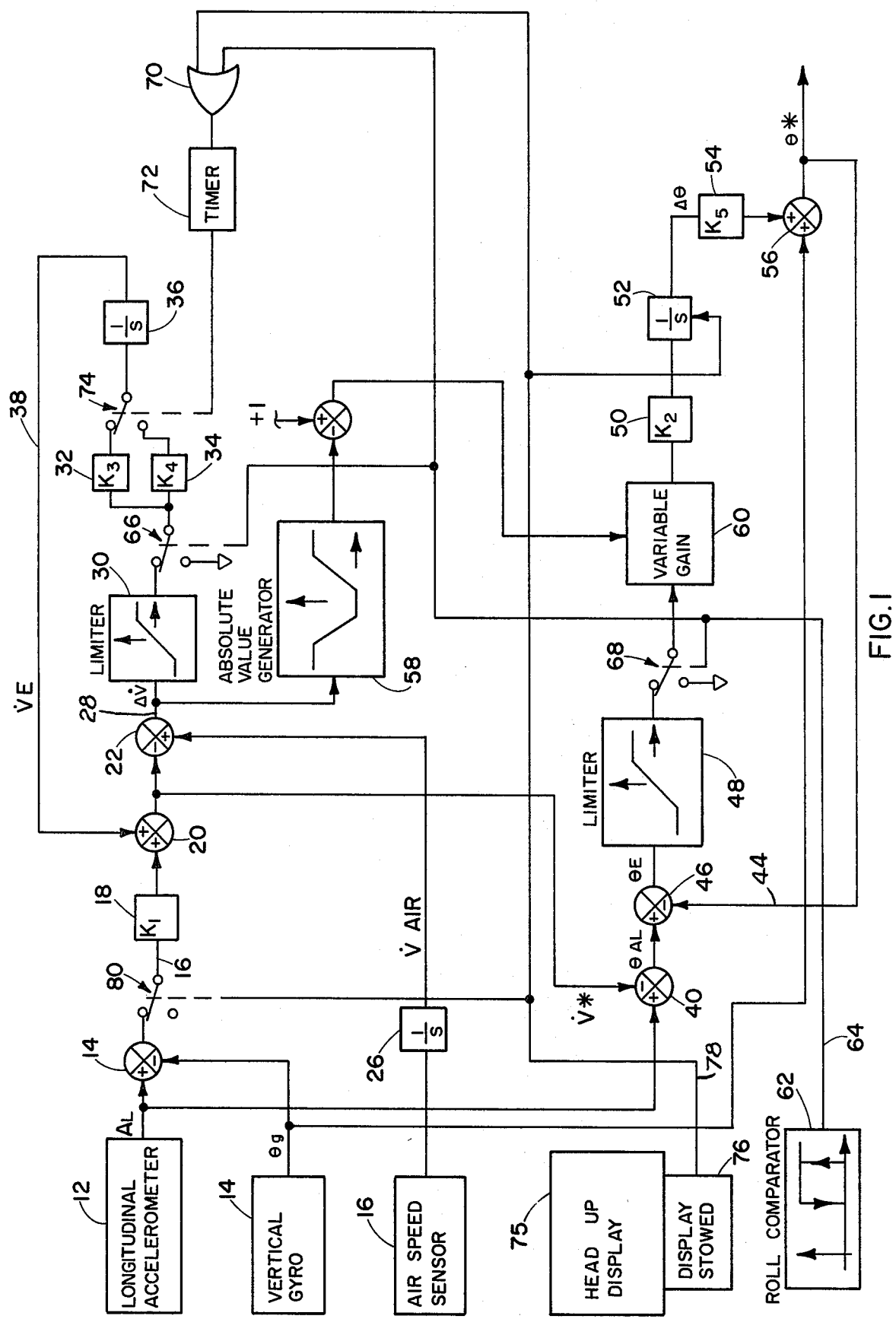
FIG. 1 is a functional block diagram of the aircraft computed pitch generating circuit.

As indicated in the functional block diagram of FIG. 1, one of the inputs to the pitch generator circuit is derived from an accelerometer that is orientated along the longitudinal axis of the aircraft. The preferred location in orientation of the accelerometer is described in some detail in U.S. Pat. No. 3,851,303. A second source of signals is a vertical gyroscope 12 which generates a signal $\theta_g$ indicating the aircraft's pitch angle or deviation of the aircraft's longitudinal axis from the horizon. The output $A_L$ of the longitudinal accelerometer 10 is applied to a positive terminal of a summing junction 14 and the output signal $\theta_g$ from the vertical gyroscope is applied to a negative terminal of summing junction 14. By subtracting $\theta_g$ from $A_L$, the output on line 16 will be a signal that substantially represents the aircraft's horizontal acceleration since the portion of the $A_L$ signal that can be attributed to pitch will have been subtracted out in the summing junction 14. This signal is then multiplied by a constant gain factor $K_i$ in amplifier 18 and applied to a positive terminal of a summing junction 20. The output of summing junction 20 $\dot{V}^*$ is defined as the computed acceleration of the aircraft which can be termed a pseudo inertial acceleration signal. Computed acceleration signal $\dot{V}^*$ is applied to a negative terminal of a third summing junction 22 which receives at a positive terminal a signal from a source of the aircraft's air speed 24 which in turn is differentiated by the differentiator 26 to produce a signal $\dot{V}_{air}$ which represents the rate of change in aircraft velocity through the air that can be considered as a measure of the aircraft's horizontal acceleration. The output of summing junction 22 $\Delta \dot{V}$ is defined as the acceleration error signal and as such represents the difference between the aircraft's acceleration as measured by the change in air speed and the aircraft's inertial acceleration as measured by the longitudinal accelerometer $A_L$. The value of $\Delta \dot{V}$ on line 28 is limited by a limiter circuit 30 and applied either through amplifier 32 or 34 to an integrator 36. Integrator 36 integrates the $\Delta \dot{V}$ signal over time thereby producing an acceleration correction signal $\dot{V}_e$ which is applied over line 38 to another positive terminal of summing junction 20. One effect of the correction signal $\dot{V}_e$ on the computed acceleration signal $\dot{V}^*$ is to, during normal operations when there is no difference between the aircraft's actual horizontal acceleration and the aircraft's acceleration through the air, to compensate the $\dot{V}^*$ signal for errors in the gyro 12 output signal $\theta_g$. In addition to compensating the computed acceleration signal $\dot{V}^*$ for long term errors in the $\theta_g$ gyro signal due to misalignment or precession errors, the computed acceleration signal $\dot{V}^*$ will not immediately be affected by variations in the velocity of the air mass which would affect the $\dot{V}_{air}$ signal since the integrator 36 will respond relatively slowly to the $\Delta \dot{V}$ error signal caused by variations in the velocity of the air mass and therefore the acceleration correction signal $\dot{V}_e$ will not be immediately affected resulting in little immediate effect on the computed acceleration signal $\dot{V}^*$. Since substantial variations in the velocity of the air mass usually only last for a relatively short time, the overall effect on $\dot{V}^*$ will be minimal in most cases.

The computed acceleration of pseudo inertial acceleration signal $\dot{V}^*$ is subtracted from the acceleration signal $A_L$ in a summing junction 40. Subtracting the portion of the $A_L$ signal that can be attributed to horizontal acceleration of the aircraft produces a signal $\theta_{AL}$ on line 42 which is equivalent to the inertial pitch of the aircraft. This signal is combined with the computed pitch signal $\theta^*$ on line 44 in a summing junction 46. The computed pitch signal $\theta^*$ is subtracted from the inertial signal $\theta_{AL}$ in summing junction 46 resulting in a pitch error signal $\theta_e$ which is transmitted through a signal limiter 48 and an amplifier 50 having a gain $K_2$ to an integrator 52. The integrator 52 integrates the pitch error signal $\theta_e$ over time producing a pitch correction signal $\Delta \theta$ which is transmitted through another amplifier 54 having a gain factor of 0.25 to a summing junction 56 where it is added to the gyro pitch signal $\theta_g$ thereby producing the computed pitch signal $\theta^*$. The pitch correction signal has the effect of correcting the computed pitch signal $\theta^*$ for long term errors in the gyro pitch signal $\theta_g$ due to precession and alignment factors. The computed pitch signal $\theta^*$ will, however, change quite rapidly in response to changes in the $\theta_g$ signal due to the fact that the integrator 52 will charge relatively slowly so that the short term response of the computed pitch signal to an actual change in aircraft pitch will correspond to the change in the gyro output signal $\theta_g$. Theoretical and operational aspects of this portion of the circuit are more fully explained in Muller U.S. Pat. No. 3,851,303.

In the event the aircraft should encounter a substantial variation in the velocity of the air mass its effect on the computed pitch signal will be substantially reduced due to the fact that the $\Delta \dot{V}$ acceleration error signal is utilized as an input to an absolute value generator 58 which in turn controls a variable gain circuit 60 in the pitch error circuit. Thus, when a change in the velocity of the air mass results in a $\Delta \dot{V}$ signal having either polarity at summing junction 22 the magnitude of the pitch error signal $\theta_e$ applied to integrator 52 will be reduced by the variable gain circuit 62 resulting in a significantly slower increase in the value of the pitch correction signal $\Delta \theta$. This will tend to compensate for whatever effects that a change in the velocity of the air mass might have on the $A_L$ signal from the longitudinal accelerometer 10. For example, in the event that the velocity of the air mass should decrease with respect in the aircraft, the aircraft will tend to keep its air speed constant which will result in an increase in the longitudinal acceleration $A_L$ of the aircraft as measured by the longitudinal accelerometer 10. By reducing the pitch error signal $\theta_e$ applied to the integrator 52, the effects of change in air mass velocity on the ultimate computed pitch signal $\theta^*$ will be significantly reduced.

It may also be desirable to set the value of the gain factor $K_1$ of amplifier 18 to a value of greater than 1.0 such as 1.25. For example, when the aircraft accelerates the gyro 10 will have a tendency to erect in a pitch up direction and when the aircraft decelerated it will erect in a pitch down direction thereby introducing an error into the computed pitch signal $\theta^*$. By increasing the value of $K_1$, the resulting increased value of $V^*$ will cause the second integrator 52 to generate the pitch correction factor $\Delta \theta$ in a direction tending to offset the erection error in $\theta_g$ at a greater rate. In addition an increased value of $K_1$ tends to correct another source of error due to lags in the pitot static system used to measure velocity. The relative increase in $\dot{V}^*$ due to $K_1$ having a value greater than one will tend to compensate for lags in the measurement of $\dot{V}_{air}$.

In order to prevent errors in the computed pitch signal $\theta^*$ when the aircraft is in a roll attitude, a gyroscopically based roll comparator circuit 62 is utilized to generate a logic signal on line 64 indicating when the aircraft is in a roll attitude. Preferably, the roll comparator 62 would have hysteresis characteristics in that a hold signal would be generated on line 64 when the aircraft's roll attitude exceeds 15° and the hold signal would be discontinued when the aircraft's roll attitude returns to less than 6°. Connected to line 64 are switches 66 and 68. When the aircraft is in a roll attitude the hold logic signal on line 64 will cause switches 66 and 68 to switch to a hold mode thereby preventing integrators 36 and 52 from generating the acceleration correction signal $\dot{V}_e$ and the pitch correction signals $\Delta \theta$ which might result from errors introduced into the system by virtue of the fact that the aircraft is for example, in a turn maneuver.

Also, so as to permit the integrator 36 to more quickly generate the acceleration correction signal $\dot{V}_e$ after the aircraft has emerged from a turn, the hold logic signal on line 64 is connected through an OR gate 70 to a timer circuit 72 which serves, by means of a switch 74, to connect amplifier 34 having the higher gain factor to integrator 36. This will cause the acceleration correction signal $\dot{V}_e$ to be generated more quickly so as to correct whatever errors may have been generated in the system due to a turn maneuver. The timer circuit 72 will serve to maintain the connection of amplifier 34 to the integrator 36 for a predetermined amount of time such as seven seconds, which is calculated to quickly restore the system to an accurate generation of the computed pitch signal.

By the same token, in order to prevent the integrators 36 and 52 from accumulating error signals when the head up display device 75 is in a stowed position, a logic circuit 76 will generate a logic signal on line 78 indicating that the head up display device 75 is in a stowed position. A logic signal on line 78 indicating that the display device is in a stowed condition will serve to initiate the integrator 52 to zero. Since the accelerometer 10 is quite often located within the head up display 75 device, as disclosed in Muller U.S. Pat. No. 3,851,303, stowing the head up display device can cause an erroneous signal output of the accelerometer 10. By activating a switch 80 when the display device 75 is stowed the accumulation of excessive signals in integrator 36 is prevented. When the head up display divice 75 is extended to its normal operating position a signal on line 78 transmitted through OR gate 70 will cause the timer 72 to switch the integrator 36 to amplifier 34 for a short predetermined amount of time thereby rapidly compensating for any offset errors that may be present in the system due to the stowage of the head up display device 75.

I claim:

1. A computed pitch circuit for aircraft, responsive to a longitudinal acceleration signal source representing aircraft longitudinal acceleration, and a gyroscope based signal source representing aircraft pitch, comprising:
   means for combining the acceleration signal with the gyroscope pitch signal to generate a computed acceleration signal;
   means responsive to the acceleration signal and said computed acceleration signal for generating an inertial pitch signal; and
   means responsive to said inertial pitch signal and the gyroscope pitch signal for generating a computed pitch signal.

2. The circuit of claim 1 wherein said computed acceleration generating means subtracts the gyro pitch signal from the acceleration signal to obtain said computed acceleration signal.

3. The circuit of claim 1 wherein said inertial pitch signal generating means subtracts said computed acceleration signal from said acceleration signal to obtain said inertial pitch signal.

4. The circuit of claim 1 wherein said computed pitch signal generating means includes:
   means for subtracting said computed pitch signal from said inertial pitch signal to generate a pitch error signal, and
   means for combining a function of said pitch error signal with said gyro pitch signal to generate said computed pitch signal.

5. The circuit of claim 1 additionally including:
   means, responsive to an air speed signal source, for generating a signal representing aircraft acceleration with respect to the air;
   means for combining said air acceleration signal with said computed acceleration signal to generate an acceleration difference signal; and
   acceleration error compensating means for combining a function of said acceleration difference signal with said computed acceleration signal.

6. The circuit of claim 5 wherein said acceleration error compensation means includes means for integrating said acceleration difference signal.

7. The circuit of claim 6 wherein said acceleration error compensating means includes means for limiting said acceleration difference signal before applying said differences signal to said integrating means.

8. The circuit of claim 7 wherein said acceleration error compensating means includes means for varying the gain of said limited acceleration difference signal as a function of aircraft roll attitude.

9. The circuit of claim 8 wherein said acceleration difference gain varying means is also responsive to a signal activating the computed pitch circuit.

10. The circuit of claim 7 wherein said varying means is effective to increase the gain of said limited acceleration signal for a predetermined time after the aircraft has stabilized from a roll attitude.

11. The circuit of claim 4 wherein said computed pitch signal generating means includes means for integrating said pitch error signal before combining it with said gyro pitch signal.

12. The circuit of claim 11 additionally including:
    means responsive to an air speed signal source, for generating a signal representing aircraft acceleration with respect to the air;
    means for combining said air acceleration signal with said computed acceleration signal to generate an acceleration difference signal; and
    acceleration error compensating means for combining a function of said acceleration difference signal with said computed acceleration signal.

13. The circuit of claim 12 including means for varying the gain of said pitch error signal as a function of said acceleration difference signal.

14. The circuit of claim 13 wherein, in said pitch error, gain varying means includes an absolute value means for varying the gain of said pitch error signal as a function of the absolute value of said acceleration difference signal.

15. The circuit of claim 14 wherein said pitch error gain varying means includes means operatively connected to said absolute value means for decreasing the value of said pitch error signal as a function of an increasing absolute value signal.

16. The circuit of claim 15 wherein said computed pitch generating means includes means for limiting said pitch error signal before its gain is modified by said pitch error gain varying means.

17. The system of claim 12 wherein said acceleration error compensating means includes means for integrating said acceleration difference signal.

18. The system of claim 17 wherein said acceleration error compensating means includes means for limiting said acceleration difference signal before applying said differences signal to said integrating means.

19. The system of claim 18 wherein said acceleration error compensating means includes means for varying the gain of said limited acceleration difference signal as a function of aircraft roll attitude.

20. The system of claim 19 wherein said acceleration difference gain varying means is also responsive to a signal activating the computed pitch circuit.

21. The system of claim 20 wherein said acceleration difference signal for a predetermined time after the aircraft has stabilized from a roll attitude.

22. The system of claim 11 wherein said pitch error integrating means includes means to inhibit the operation of said pitch error signal integrating means when the aircraft is in a roll attitude.

23. The system of claim 6 wherein said acceleration difference signal integrating means includes means to inhibit the operation of said acceleration difference signal integrating means when the aircraft is in a roll attitude.

24. The circuit of claim 5 including means for increasing the gain of said computed acceleration signal by a factor greater than 1.0.

25. The circuit of claim 24 wherein said gain increasing means increases said computed acceleration signal by a factor of 1.25.

26. The circuit of claim 6 wherein said acceleration difference integrating means includes means to inhibit integrating means when said circuit is not in operation.

27. A circuit for use in aircraft having a longitudinal accelerometer signal source, a vertical gyroscope signal source and an air speed signal source, for computing a signal representing the horizontal acceleration of the aircraft, comprising:
means for combining the longitudinal accelerometer signal with the gyroscope signal to generate a horizontal acceleration signal;
means, responsive to said air speed signal, to generate an acceleration signal based on air speed;
means for combining a function of said horizontal acceleration signal with said air acceleration signal to generate an acceleration error signal; and
means for combining a function of said acceleration error signal with said horizontal acceleration signal to generate the computed acceleration signal.

28. The circuit of claim 27 wherein said horizontal acceleration signal generating means includes means for subtracting the gyroscope signal from said accelerometer signal.

29. The circuit of claim 27 wherein said air speed acceleration signal generating means includes a circuit for differentiating the air speed signal.

30. The circuit of claim 27 wherein said acceleration error signal generating means includes means for subtracting said computed acceleration signal from said air acceleration signal.

31. The circuit of claim 30 wherein said computed acceleration signal generating means includes means for integrating said acceleration error signal to generate an acceleration correction signal and means for combining said error correction signal with said horizontal acceleration signal.

32. The circuit of claim 31 wherein said computed acceleration signal generating means includes means for limiting said acceleration error signal.

33. The circuit of claim 30 additionally including a source of signals responsive to the roll attitude of the aircraft and means operatively connected to said computed acceleration signal generating means and responsive to said roll attitude signal for varying the gain of said acceleration error signal as a function of roll attitude.

34. The circuit of claim 33 wherein said gain varying means includes a timing circuit operatively responsive to said roll attitude signal effective to increase the gain of said acceleration error signal for a predetermined time after a minimum roll attitude signal is received.

35. A circuit for generating a computed pitch signal for use in aircraft having an air speed signal source, a longitudinal accelerometer signal source, and a vertical gyroscope signal source representing pitch attitude, comprising:
a first summing junction circuit for subtracting the longitudinal accelerometer signal from the gyro pitch signal to produce a longitudinal acceleration signal;
a second summing junction circuit for summing said longitudinal acceleration signal with an acceleration correction signal to produce a computed acceleration signal;
a differentiating circuit for differentiating said air speed signal;
a third summing junction circuit for subtracting said computed acceleration signal from said differentiating air speed signal to produce an acceleration error signal;
a first integrator circuit for integrating said acceleration error signal to produce said acceleration correction signal;
a fourth summing junction circuit for subtracting said computed acceleration signal from the gyro pitch circuit to produce an inertial pitch circuit;
a fifth summing junction circuit for subtracting the computed pitch signal from said inertial pitch signal to produce a pitch error signal;
a second integrator circuit for integrating said pitch error signal to produce a pitch correction signal; and
a sixth summing junction circuit for combining said pitch correction signal with the gyro pitch circuit to produce the computed pitch circuit.

* * * * *